United States Patent
Blake et al.

(10) Patent No.: US 7,816,289 B2
(45) Date of Patent: Oct. 19, 2010

(54) FIRE RESISTANT BARRIER LAMINATES AND ARTICLES MADE THEREFROM

(75) Inventors: Holly Blake, Newark, DE (US); Paul Dacey, Newark, DE (US)

(73) Assignee: Gore Enterprise Holdings, Inc., Newark, DE (US)

( * ) Notice: Subject to any disclaimer, the term of this patent is extended or adjusted under 35 U.S.C. 154(b) by 182 days.

(21) Appl. No.: 11/203,553

(22) Filed: Aug. 12, 2005

(65) Prior Publication Data

US 2007/0037020 A1 Feb. 15, 2007

(51) Int. Cl.
*B32B 5/26* (2006.01)
*D03D 15/00* (2006.01)

(52) U.S. Cl. .............. 442/239; 442/301; 442/302; 428/121

(58) Field of Classification Search ............ 442/239, 442/301, 302
See application file for complete search history.

(56) References Cited

U.S. PATENT DOCUMENTS

| | | | |
|---|---|---|---|
| 4,532,316 A | 7/1985 | Henn | 528/59 |
| 4,679,257 A * | 7/1987 | Town | |
| 5,418,054 A | 5/1995 | Sun | 428/308.4 |
| 5,740,551 A * | 4/1998 | Walker | |
| 5,928,971 A | 7/1999 | Ellis et al. | |
| 6,253,777 B1 * | 7/2001 | Anderson | 135/115 |
| 6,395,383 B1 | 5/2002 | Maples | 428/319.3 |
| 2003/0082972 A1* | 5/2003 | Monfalcone et al. | 442/138 |
| 2005/0097652 A1* | 5/2005 | Rock et al. | 2/82 |

FOREIGN PATENT DOCUMENTS

| | | |
|---|---|---|
| WO | WO 97/47212 | 12/1997 |
| WO | WO 01/26495 | 4/2001 |
| WO | WO 01/66193 | 9/2001 |
| WO | WO 2005/061777 | 7/2005 |

OTHER PUBLICATIONS

PCT International Search Report PCT/US2006/028624 (2 pages).

* cited by examiner

*Primary Examiner*—Lynda Salvatore
(74) *Attorney, Agent, or Firm*—Carol A. White

(57) ABSTRACT

This invention relates to the production of durably liquid-proof laminates and articles made therefrom, the laminates incorporating at least one barrier layer and at least one fire resistant woven textile layer, the textile layer having a weight of about 2.5 ounces per square yard or less. Garments, protective covers and other protective articles incorporating this laminate are also described.

16 Claims, 2 Drawing Sheets

FIRE RESISTANT BARRIER LAMINATES AND ARTICLES MADE THEREFROM

FIELD OF THE INVENTION

This invention relates to the production of liquidproof and fire resistant laminates incorporating a barrier layer and at least one fire resistant textile layer.

BACKGROUND OF THE INVENTION

The use of coated textile composites or laminates of textiles and liquid protective barrier membrane layers to create liquidproof protective apparel is well known in the industry. The most common of these applications is waterproof breathable apparel. Typical examples are laminate materials sold by W. L. Gore and Associates, Inc. under the registered trade name GORE-TEX, which contain a waterproof breathable film laminated, or bonded, to one or more textile layers. These laminates are fabricated into apparel and sold as GORE-TEX® garments and the like. Coated textiles can also be used in textile composites for these same purposes. Both coated textiles and protective barrier membrane, or film, laminates will be collectively referred to hereafter as "laminates" solely for convenience of description. Depending on the requirements of the final article, the laminates can include constructions of a variety of layers. For example, conventional three layer laminate constructions typically incorporate at least one knit textile layer to permit seam sealing to that layer.

In the particularly demanding arenas of fire and safety service, the need for textiles which can withstand these more rigorous environments introduces challenges in forming laminated structures that retain liquidproofness even after flexing and abrasion which occur during use. For example, textiles with enhanced fire resistance typically comprise fibers such as fiberglass, aramids, melamine and the like. The composition of the textiles themselves can introduce additional challenges in bonding, or lamination, to create a durable bond between the barrier layer and the textile material.

Accordingly, a need has existed for lightweight, strong, flexible and durably liquidproof laminates including a barrier layer which can be readily formed into liquidproof articles to meet a wide range of demanding environmental conditions, such as fire resistance and the like.

SUMMARY OF THE INVENTION

Definitions

As used herein, these terms are defined as follows:

"Laminate" is a flexible article comprised of multiple flexible layers resulting in a composite.

"Barrier layer" or "functional layer" or "protective layer" (or "film") are defined as a film or coating that provides a barrier to liquid water penetration as a minimum, and ideally to a range of liquid and vapor chemical challenges and biological challenges. The layer is considered liquidproof if it prevents liquid water penetration against a pressure of at least 0.07 bar (1 psi) for a duration of at least 3 minutes. The protective layer material preferably guarantees prevention of liquid water penetration at pressure of more than 0.07 bar (1 psi). The prevention of liquid water penetration at a certain pressure is measured on a liquidproof panel based on the same conditions described with respect to the Suter Test for Liquidproof Seams, described herein.

"Seam" is defined as the area where 2 or more pieces or panels of laminate are joined together by sewing, gluing or other mechanical joining.

"Liquidproof seam" is a seam that will not leak or weep liquid when challenged with a test fluid at a pressure of at least 0.07 bar (1 psi) for a duration of at least 3 minutes. The test fluid is at a minimum water, and ideally can be a range of liquid chemicals.

"Fire resistant woven textile" is a woven textile which is capable of passing the Vertical Flame Test.

"Breathable" is defined as having the ability to transport moisture vapor through a material.

"Cover factor" or "coverage factor" is a measure of the open nature of the weave in a woven textile and is defined as:

$$*CF\text{total}=CFm+CFt$$

$CFm=\sqrt{Fm}\times Dm$, $CFt=\sqrt{Ft}\times Dt$

CFm: Cover factor of the warp thread
CFt: Cover factor of the weft thread
Fm: Fineness of the warp thread (dtex)
Ft: Fineness of the weft thread (dtex)
Dm: Density of the warp thread (count/2.54 cm)
Dt: Density of the weft threads (count/2.54 cm)

The present invention is directed to lightweight, strong, flexible and durably liquidproof laminates including a barrier layer which can be readily formed into liquidproof articles to meet a wide range of demanding environmental conditions. Specifically the present invention is directed in one embodiment to laminates incorporating at least one barrier layer and at least one fire resistant woven textile layer, the textile layer having a weight of about 2.5 ounces per square yard or less. In a more preferred embodiment, the laminates of the present invention incorporate at least one barrier layer and at least one fire resistant woven textile layer, the textile layer having a weight of about 0.9 to 2.5 ounces per square yard. In an even further preferred embodiment, the fire resistant woven textile layer may have a weight of between 1 and 2 ounces per square yard, and even more preferably a weight of between 1.6 and 1.8 ounces per square yard. In a further embodiment, the at least one fire resistant woven textile layer preferably has a cover factor of about 1800 or less, more preferably about 1400 or less. Suitable compositions for the fire resistant textiles of the present invention include, but are not limited to, materials such as fiberglass, meta-aramids, para-aramids, melamine, PBI, PBO and the like, including blends and combinations of such materials, and may include other materials as components for specific desired functionality depending on the desired end use.

It was surprisingly discovered that suitable laminate constructions incorporating a fire resistant woven textile wherein the textile has a weight below 2.5 ounces per square yard could be fabricated and incorporated into durably liquidproof articles. It was further surprisingly discovered that embodiments incorporating these low weight textiles wherein the textiles further have a cover factor of 1800 or less could be fabricated and incorporated into durably liquidproof articles.

Suitable barrier layers for the laminate of the present invention may include protective membranes, films or coatings. Barrier layers may be selected from the group of materials including, but not limited to, fluoropolymers such as polytetrafluoroethylene, polyvinylidene chloride, polyvinyl fluoride, butyl rubber, polyethylene, polypropylene, polyvinyl chloride, polyvinylidene fluoride, polyamide, chlorinated polyethylene, chlorosulfonated polyethylene, polyethylene terepthalate, ionomers, fluorinated ethylene propylene, perfluoroalkoxy, urethanes, polyurethanes, THV, polyolefins, acrylics, natural rubbers, fluoroelastomers, ethylene vinyl acetate, ethylene tetrafluoroethylene, polyesters, polyamides, polyketones, polysulfones, polycarbonates, silicones, polyacrylates, co-polyether esters and co-polyether amides, and combinations thereof. For waterproof breathable applications the barrier layer is preferably formed from expanded polytetrafluoroethylene (ePTFE). Expanded polytetrafluoroethylene is known to be very waterproof and highly breathable. The ePTFE may be provided with a coating of a hydrophilic polymer in known manner. Such laminates may preferably provide a water-vapour transmission rate of greater than 1500 $g/m^2/day$ (particularly greater than 3000 $g/m^2/day$) and a water entry pressure of greater than 0.07 bar for a period of at least three minutes. For chemical protective application, laminates incorporating impermeable or selectively permeable layers such as GORE CHEM-PAK® fabrics, available from W.L. Gore and Associates, Inc. (Elkton, Md.), fluorinated sulfonic acid copolymers such as NAFION®, available from DuPont (Wilmington, Del.), and copolymers of polyethyleneimines and polyvinyl alcohols, such as PEPGEL®, available from Stedfast, Inc. (Quebec, Canada), would be preferred.

Depending on the desired end use the thickness of the barrier layer can vary widely. Preferred thicknesses of the barrier layer are in the range of about 200 microns or less, more preferably about 100 microns or less, and even 50 microns or less, and even down to as thin as 20 microns or less. As noted above, the composition of the barrier layer can be any suitable to the end use, and the barrier layer may be breathable or non-breathable, again depending on the desired end use.

Additional textile layers may be incorporated with the laminates described. For example, in accordance with the present invention, it is possible to provide one or more additional textile layers on the face, or surface, of the barrier layer opposite the face to which the at least one fire resistant woven textile having a weight below 2.5 ounces per square yard is bonded. This additional, or second, textile layer may comprise any construction suitable for the end use application. For example, the at least one second textile layer may comprise woven, nonwoven or knit constructions of varying weights, thicknesses and coverage factors, again as needed to meet the requirements of the end application. Multilayer textile layers are also contemplated for the at least one second textile layer. In one embodiment of the invention, the second textile layer may be of the same or similar construction as the fire resistant woven textile having a weight below 2.5 ounces per square yard. Alternatively, the at least one second textile layer may have a different construction from the fire resistant woven textile having a weight below 2.5 ounces per square yard. Thus, significant design options exist for tailoring a variety of laminate constructions in accordance with the present invention.

Articles of the present invention may be fabricated in a variety of configurations which take advantage of the unique properties of the novel laminates of this invention. Liquidproof seaming techniques apparent to those of skill in the art may be used to assemble laminate panels into desired configurations which maintain the beneficial liquidproofness features in the final assembled structure. For example, it is contemplated that suitable articles made in accordance with the present invention include garments for protecting all parts of the body, protective covers, equipment and supply covers and other such protective articles.

DETAILED DESCRIPTION OF THE INVENTION

The unique laminates and articles of the present invention provide a number of advantages over conventional materials. Particularly, the present invention provides lightweight, fire resistant and liquidproof laminates which can be fabricated into a variety of lightweight and liquidproof structures and articles which can withstand a wide range of demanding environmental conditions.

Figure 1:
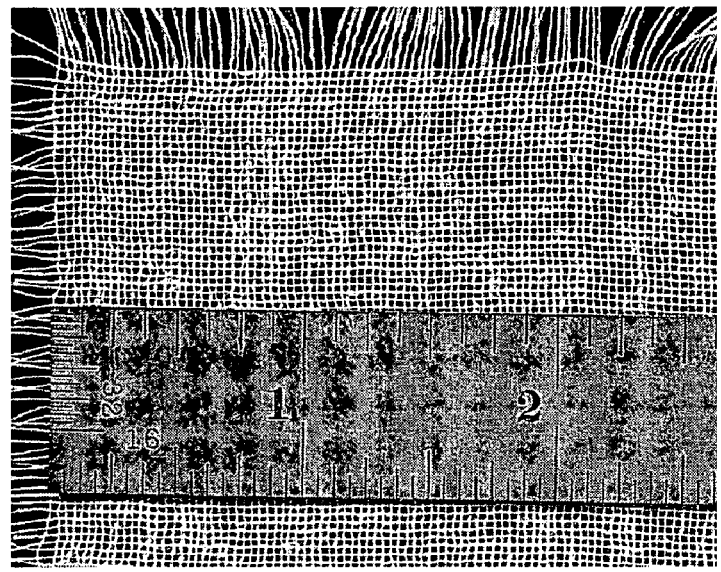
FIG. 1 is a top perspective photograph of a textile having a coverage factor of about 1100 which is suitable for use in the present invention

As noted earlier, the present invention is directed in one embodiment to laminates incorporating at least one barrier layer and at least one woven textile layer, the fire resistant textile layer having a weight of about 2.5 ounces per square yard or less. It was surprisingly discovered that suitable laminate constructions incorporating a fire resistant woven textile wherein the textile has a weight below 2.5 ounces per square yard could be fabricated and incorporated into durably liquidproof articles. It was further surprisingly discovered that embodiments incorporating these low weight textiles wherein the textiles further have a cover factor of 1800 or less, or even 1400 or less, could be fabricated and incorporated into durably liquidproof articles. Referring to FIG. 1, there is shown a top perspective photograph of a textile, along with a ruler scale shown in inches, having a coverage factor of about 1100 which is suitable for use in the present invention.

Additional textile layers may be incorporated with the laminates described. For example, laminate constructions wherein the laminate comprises a barrier layer bonded on one side to a fire resistant textile layer having a weight of about 2.5 ounces per square yard or less, and on the other side to a different textile are contemplated. Alternatively, the laminate construction of the present invention may be one wherein fire resistant textile layers having a weight of about 2.5 ounces per square yard or less are oriented on both sides of the barrier layer.

Lamination of materials for the purposes of this invention may be carried out by any suitable conventional lamination techniques. For example, in one technique, a dot pattern of adhesive may be applied onto one or more of the layers to be joined by a gravure roll, and lamination then occurs by passing the materials between the pressure rollers and curing. Alternatively, a continuous adhesive may be used, whether applied during a continuous lamination process or by batch lamination.

Figure 2:
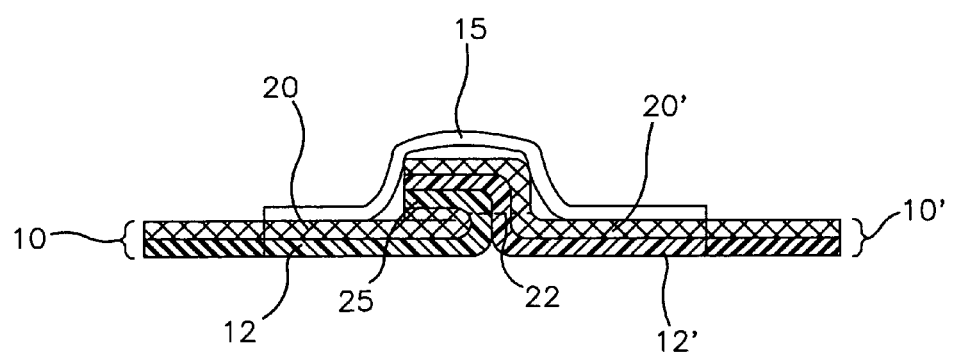
FIG. 2 shows a perspective view of a seamed panel incorporating a laminate formed in accordance with the present invention.

Articles of the present invention may be fabricated into a variety of configurations which take advantage of the unique properties of the novel laminates of this invention. Liquidproof seaming techniques apparent to those of skill in the art may be used to assemble laminate panels into desired configurations which maintain the beneficial liquidproofness features in the final assembled structure. For example, in one embodiment of the invention, referring to FIG. 2, there is shown a seam between laminate panels 10, 10' wherein each laminate panel comprises a barrier layer 12, 12' and a fire resistant woven textile layer 20, 20'. Stitch lines 22 and 25 sew the laminate panels 10, 10' together, and seam tape 15 covers the seam and bonds to the woven textile layers 20, 20' to form a liquidproof seam. Other protective articles apparent to one of skill in the art are also contemplated as within the scope of the present invention.

Embodiments of the present invention will now be described by way of example only with reference to the following examples.

Test Methods

Determination of Weight of Textiles/Laminates

Material weights are determined by cutting a 3½ inch circle from the material sample, weighing the sample and converting the weight per unit area of the sample to a weight per unit area in ounces per square yard.

Suter Test for Liquidproof Seams

To determine whether a sample which was seamed was liquidproof, the Suter test procedure was used. This procedure is based generally on the description in ASTM D 751-00, *Standard Test Methods for Coated Fabrics (Hydrostatic Resistance Procedure B2)*. This procedure provides a low pressure challenge to the sample being tested by forcing water against one side of the test sample and observing the other side for indication that water has penetrated through the sample.

The test sample was clamped and sealed between rubber gaskets in a fixture that held the sample so that water could be applied to a specific area. For seamed samples, the area to which water was applied was 4.25 inches in diameter, with the seam centered within this area. The water was applied at a pressure of 1 psig (0.07 bar) to one side of the sample. In testing a sealed seam, the seam taped side of the sample was observed for leaks while water was applied to the opposite side.

The seam taped side of the sample was observed visually for any sign of water appearing for 3 minutes. If no water was observed, the sample was deemed to have passed the test and was considered liquidproof.

Chemical Permeation Test

Samples of the sealed seams of assembled laminate samples were tested for liquid penetration resistance in accordance with ASTM F903, *Standard Test Method for Resistance of Protective Clothing Materials to Penetration by Liquids*, using exposure Procedure C using Aqueous film-forming foam (AFFF) at a 3% concentrate and Surrogate gasoline fuel C as defined in ASTM D 471, *Standard Test Method for Rubber Property—Effect of Liquids* at a 50/50 percent volume of toluene and iso-octane. A sample is said to pass the chemical permeation test when it shows no sign of liquid penetration.

Breathability/Moisture Vapor Transmission Test

Breathability was determined by subjecting a sample of a laminate construction to Total Heat Loss Testing in accordance with ASTM F1868, Standard Test Method for Thermal and Evaporative Resistance of Clothing Materials Using a Sweating Guarded Hot Plate using Part C.

Vertical Flame Test

Vertical flame resistance was determined according to FED-STD-191A Method 5903.1, *Flame Resistance of Cloth; Vertical*. Methane gas (99% pure) was used along with a Vertical Flammability Tester (Model 7635A from United States Testing Co., Inc., Hoboken, N.J.). The test specimen size was 3 inches by 12 inches. Samples were conditioned at 70+/−2° F. and 65+/−2% RH for at least 24 hours before testing.

A specimen was said to be flame resistant if the afterflame was less than 2 seconds, the char length was less than 100 mm and the specimen did not melt or drip during the test.

EXAMPLES

Example 1

A laminate was formed by bonding a barrier membrane to a textile layer. The barrier membrane incorporated polytetrafluoroethylene and was prepared generally according to the teachings of U.S. Pat. No. 5,418,054 (Part No. 4410030, from W.L. Gore & Associates, Elkton, Md.). The membrane was affixed to a woven textile layer, described below, by gravure printing a moisture curable polyurethane adhesive prepared according to the teachings of U.S. Pat. No. 4,532,316, onto the membrane surface, covering approximately 40% of the membrane surface, then pressing the two layers together in a nip roll. The textile comprised woven yarns comprising about 95% meta-aramid, about 3% para-aramid, and about 2% anti-static fibers, the textile weighing about 1.7 ounces per square yard and having a total coverage factor of about 1120 (W. L. Gore & Associates, Inc, Elkton, Md. as part number WCBZ100).

The resulting laminate weighed about 2.9 ounces per square yard.

Example 2

A laminate was formed by bonding a barrier membrane to a textile layer. The barrier membrane was a fire resistant polyurethane film available as Part No. PT9700, gauge 0085, from Deerfield Urethane, Inc. (Whately, Mass.). The membrane was affixed to a textile layer having the same composition as described in Example 1 using a non-woven hot melt adhesive web (Part No. PAIS41-050-060P from Spunfab, Ltd (Cuyahoga Falls, Ohio)) by applying heat (325° F.) and pressure to the stacked layers using a heated press for 5 seconds to form a laminate.

The resulting laminate weighed about 8.3 ounces per square yard.

Example 3

A laminate was formed by bonding barrier membrane between two woven textile layers, referred to herein for convenience as a shell (outer relative to its orientation in a finished garment) textile, and a liner (inner relative to its orientation in a finished garment) textile. The barrier membrane was the same membrane described in Example 1. This membrane was laminated between the shell textile and liner textile by first gravure printing the moisture curable polyurethane adhesive described in Example 1 onto both sides of the barrier membrane, covering approximately 30%-40% of the membrane surface on each side. The shell textile layer, the barrier layer and the inner textile layer were oriented in a stacked configuration, then the layers were pressed together by passing through a nip roll. The shell textile was made from yarns comprising para-aramid, meta-aramid, and anti-static fibers, weighing about 3.3 ounces per square yard (Part No. WNPZ100, W. L. Gore & Associates, Inc, Elkton Md.). The liner textile was made from yarns comprising para-aramid, meta-aramid, and anti-static fibers weighing about 1.7 ounces per square yard and having a total coverage factor of about 1120 (Part No. WCBZ100, W.L. Gore & Associates, Inc, Elkton, Md.). The resulting laminate weighed about 6.9 ounces per square yard.

A sample formed in accordance with this Example was tested for chemical permeation using the Chemical Permeation Test described earlier herein, except that the exposure procedure was Procedure C using aqueous film-forming foam (AFFF) at a 3% concentration. The sample passed the Chemical Permeation Test as it showed no sign of liquid penetration.

Another sample formed in accordance with this Example was tested for flame resistance using the Vertical Flame Test described earlier herein. Results are reported in the table below.

| Property | NFPA 1971-200 edition requirement (Section 5-1.4) | Results obtained |
|---|---|---|
| Char length | Shall not be more than 100 mm (4 in.) average | Warp average: 57.8 mm<br>Fill average: 56.4 mm |
| After flame | Shall not be more than 2.0 seconds average | Warp average: 0 sec<br>Fill average: 0 sec |
| Appearance | Shall not melt or drip | Did not melt or drip |

Another sample formed in accordance with this Example was first preconditioned by subjecting the sample to five cycles of washing and drying in accordance with the procedure specified in Machine Cycle 1, Wash Temperature V, and Drying Procedure Ai of AATCC 135, *Dimensional Changes in Automatic Home Laundering of Woven and Knit Fabrics*. A 1.82-kg+/−0.1 kg load was used. The pre-conditioned sample was then tested for flame resistance using the Vertical Flame Test. Results are reported in the table below.

| Property | NFPA 1971-200 edition requirement (Section 5-1.4) | Results obtained |
|---|---|---|
| Char length | Shall not be more than 100 mm (4 in.) average | Warp average: 59.6 mm<br>Fill average: 65.4 mm |
| After flame | Shall not be more than 2.0 seconds average | Warp average: 0 sec<br>Fill average: 0 sec |
| Appearance | Shall not melt or drip | Did not melt or drip |

Another sample formed in accordance with this Example was tested for breathability using the Breathability/Moisture Vapor Transmission Test, described earlier herein. The total heat loss value obtained was 659 W/m2. As a reference, a comparative laminate construction replacing the liner layer with a knit of similar weight yielded a total heat loss value of 570 W/m2. The laminate weight of both the construction of this Example and the comparative construction was 6.9 ounces per square yard.

Example 4

A laminate was formed by bonding barrier membrane between two woven textile layers, referred to herein for convenience as a shell (outer relative to its orientation in a finished garment) textile, and a liner (inner relative to its orientation in a finished garment) textile. The barrier membrane was made from polytetrafluoroethylene according to the teachings of U.S. Pat. No. 6,395,383 (Part No. 64193, W.L. Gore & Associates, Inc. Elkton, Md.). This membrane was laminated between the shell textile and liner textile by first gravure printing the moisture curable polyurethane adhesive described in Example 1 onto both sides of the barrier membrane, covering approximately 30%-40% of the membrane surface on each side. The shell textile layer, the barrier layer and the inner textile layer were oriented in a stacked configuration, then the layers were pressed together by passing through a nip roll. The shell textile was made from yarns comprising para-aramid, meta-aramid, and anti-static fibers, weighing about 3.3 ounces per square yard (Part No. WGPZ000, W. L. Gore & Associates, Inc, Elkton Md.). The liner textile was made from yarns comprising para-aramid, meta-aramid, and anti-static fibers weighing about 1.7 ounces per square yard and having a total coverage factor of about 1120 (Part No. WCBZ100, W.L. Gore & Associates, Inc, Elkton, Md.).

The resulting laminate weighed about 7.4 ounces per square yard.

Example 5

A laminate was formed by bonding barrier membrane between two woven textile layers, referred to herein for convenience as a shell (outer relative to its orientation in a finished garment) textile, and a liner (inner relative to its orientation in a finished garment) textile. The barrier membrane was the same membrane described in Example 1. This membrane was laminated to the liner textile, described below, by gravure printing a moisture curable polyurethane adhesive, prepared according to the teachings of U.S. Pat. No. 4,532,316, covering approximately 40% of the membrane surface. The membrane and liner textile layers were pressed together in a nip roll. The shell textile, described below, was affixed to the remaining exposed membrane barrier layer surface using a nonwoven hot-melt adhesive web (part number PAIS41-050-060P from Spunfab, Ltd of Cuyahoga Falls, Ohio) as described in Example 2. The shell textile was made from yarns comprising PBI® and Kevlar® fibers, weighing about 7.0 ounces per square yard (available from Safety Components Fabric Technologies, Inc, Greenville, S.C. as PBI Gold Plus 70). The liner textile was made from yarns comprising para-aramid, meta-aramid, and anti-static fibers weighing about 1.7 ounces per square yard and having a total coverage factor of about 1120 (available from W.L. Gore & Associates, Inc, Elkton, Md. as part number WCBZ100).

The resulting laminate weighed about 10.1 ounces per square yard.

Example 6

A laminate was formed comprising a barrier membrane sandwiched between a woven fire resistant textile layer and a nonwoven layer. The barrier membrane was made from polytetrafluoroethylene (Part No. 11544NA, available from W.L. Gore & Associates, Elkton, Md.). This membrane was laminated on one side, in a manner generally described by U.S. Pat. No. 5,026,591, using a continuous layer of hot melt, moisture curable polyurethane adhesive, prepared according to the teachings of U.S. Pat. No. 4,532,316, with an adhesive thickness of approximately 0.001 inches to a non-woven textile weighing about 3.0 ounces per square yard, comprised of meta-aramid and para-aramid fibers (Part No. NOMX008NW, available from W.L. Gore & Associates, Inc.). The other side of the membrane was affixed to a woven textile layer using a nonwoven hot-melt adhesive web (Part No. PAIS41-050-060P from Spunfab, Ltd of Cuyahoga Falls, Ohio). The woven textile was made from yarns comprising para-aramid, meta-aramid, and anti-static fibers weighing about 1.7 ounces per square yard and having a total coverage factor of about 1120 (available from W.L. Gore & Associates, Inc, Elkton, Md. as part number WCBZ100).

The resulting laminate weighed about 6.2 ounces per square yard.

Example 7

A laminate was formed comprising a barrier membrane sandwiched between two woven textile layers having the same composition. The barrier membrane was the same as described in Example 1. This membrane was laminated between the two textile layers, described below, by first gravure printing the moisture curable polyurethane adhesive described in Example 1 onto both sides of the barrier membrane, covering approximately 30%-40% of the membrane surface on each side. The first woven textile layer, the barrier layer and the second woven textile layer were oriented in a stacked configuration, then the layers were pressed together by passing through a nip roll. The textile layers were each made from yarns comprising para-aramid, meta-aramid, and anti-static fibers weighing about 1.7 ounces per square yard and having a total coverage factor of about 1120 (available from W.L. Gore & Associates, Inc, Elkton, Md. as part number WCBZ100).

The resulting laminate weighed about 5.0 ounces per square yard.

Example 8

A laminate was formed comprising a barrier membrane sandwiched between a woven textile layer and a knit layer. The barrier membrane was the same as described in Example 1. The membrane was affixed to the woven textile layer, described below, by gravure printing a moisture curable polyurethane adhesive, prepared according to the teachings of U.S. Pat. No. 4,532,316, covering approximately 40% of the membrane surface. The two layers were pressed together in a nip roll. The remaining exposed surface of the membrane was affixed to a knit textile layer, described below, using a nonwoven hot-melt adhesive web (Part No. PAIS41-050-060P from Spunfab, Ltd of Cuyahoga Falls, Ohio). The woven textile was made from yarns comprising para-aramid, meta-aramid, and anti-static fibers weighing about 1.7 ounces per square yard and having a total coverage factor of about 1120 (available from W.L. Gore & Associates, Inc, Elkton, Md. as part number WCBZ100). The knit textile layer was made from para-aramid yarns weighing about 1.8 ounces per square yard (available from W.L. Gore & Associates, Inc, Elkton, Md. as part number KRDZ600).

The resulting laminate weighed about 4.9 ounces per square yard.

Example 9

Two panels of the laminate construction formed in Example 3 were stacked together with the shell textile layer of each panel touching. A seam was sewn along one edge of the panels to join the two panels together. The two panels were opened to expose the seam with the liner textiles facing upward, the seam edge was folded to one side, and a seam tape (Part No. 8GNAJ025NATX, W.L. Gore & Associates, Inc., Elkton, Md.) was placed over the sewn seam so that it spanned the entire seam region and adhered to the liner textiles to form a liquidproof seam.

The seamed panels were then subjected to the Suter Test for Liquidproof Seams, described earlier. The sample passed the Suter Test of 1 psi for 3 min and remained liquidproof.

An additional seamed laminate construction fabricated as described above was sewn into a composite per NFPA 1971, 2000 edition section 6-28.7.1 without the layer of 7.5 osy natural Nomex against the layer of Q9 thermal barrier material. The sewn composite was subjected to the preconditioning requirements of NFPA 1971, 2000 edition Section 6-28.3.5. Samples of the sealed seams of each composite were tested for liquid penetration resistance in accordance with ASTM F903, *Standard Test Method for Resistance of Protective Clothing Materials to Penetration by Liquids*, using exposure Procedure C using Aqueous film-forming foam (AFFF) at a 3% concentrate and Surrogate gasoline fuel C as defined in ASTM D 471, *Standard Test Method for Rubber Property—Effect of Liquids at a 50/50 percent volume of toluene and iso-octane.*

The sample passed (showed no sign of liquid penetration) both liquid challenges.

Example 10

Two panels of the laminate construction (same woven textile on each side of barrier layer) formed in Example 7 were stacked together. A seam was sewn along one edge of the panels to join the two panels together. The two panels were opened to expose the seam with the seam edge facing upward, then the seam edge was folded to one side and a seam tape (Part No. TAF-880 tape, Adhesive Films, Inc.) was placed over the sewn seam so that it spanned the entire seam region and adhered to the liner textiles to form a liquidproof seam.

The seamed panels were then subjected to the Suter Test for Liquidproof Seams, described earlier. The sample passed the Suter Test of 1 psi for 3 min and remained liquidproof.

We claim:

1. An article comprising
    a first laminate panel and a second laminate panel, each said laminate panel comprising
    at least one liquidproof barrier layer,
    a first fire resistant woven textile layer comprising meta-aramid, para-aramid, PBI, PBO, or blends thereof having a weight of less than or equal to 7 ounces per square yard bonded to a side of the at least one liquidproof barrier, and
    a second fire resistant woven textile layer bonded to a side of the at least one liquidproof barrier layer opposite the first fire resistant woven textile layer to form the first and second laminate panels, said second fire resistant woven textile layer consisting essentially of woven yarns comprised of meta-aramid, para-aramid, PBI, PBO, or blends thereof having a weight of about 2.5 ounces per square yard or less; and
    at least one liquidproof seam joining together the at least two laminate panels comprising a seam tape that covers a seam and bonds to the second woven textile layers of the first and second laminate panels,
    wherein the first laminate panel and the second laminate panel are flame resistant forming a char length of less than 100 mm when subjected to a vertical flame test.

2. The article of claim 1, wherein the barrier layer comprises a selectively permeable chemical protective layer.

3. An article comprising
    a first laminate panel and a second laminate panel, each said laminate panel comprising at least one liquidproof barrier layer and at least one fire resistant woven textile layer bonded to the at least one barrier layer to form the first and second laminate panels, said textile comprising meta-aramid, para-aramid, PBI, PBO, or blends thereof having a weight of about 2.5 ounces per square yard or less, wherein the first and second laminate panels are joined together by a sewn seam; and
    a seam tape that covers the sewn seam and bonds to the at least one woven textile layers of the first and second laminate panels to form at least one liquidproof seam joining together the at least two laminate panels.

4. The article of claim 3, wherein the article further comprises a seam edge and the seam edge is folded onto at least one fire resistant woven textile layer of either the first or second laminate panel, and the seam tape covers the sewn seam and the seam edge and bonds to the at least one woven textile layers of the first and second laminate panels to form at least one liquidproof seam.

5. The article of claim 3, wherein the at least one barrier layer comprises a selectively permeable chemical protective layer.

6. The article of claim 3, wherein the textile of the at least one fire resistant woven textile layer comprises meta-aramid and para-aramid fibers.

7. The article of claim 3, wherein the barrier layer comprises a plurality of layers.

8. The article of claim 3, wherein said at least one first fire resistant woven textile layer has a weight of about 0.9 to 2.5 ounces per square yard.

9. The article of claim 3, wherein said at least one first fire resistant woven textile layer has a weight of about 1 to 2 ounces per square yard.

10. The article of claim 3, wherein said at least one first fire resistant woven textile layer has a weight of about 1.6 to 1.8 ounces per square yard.

11. The article of claim 3, wherein the at least one first fire resistant woven textile layer has a cover factor of about 1800 or less.

12. The article of claim 3, wherein the at least one first fire resistant woven textile layer has a cover factor of about 1400 or less.

13. The article of claim 3, wherein the barrier layer comprises a fluoropolymer.

14. The article of claim 3, wherein the barrier layer comprises expanded PTFE.

15. The article of claim 3, wherein the barrier layer is breathable.

16. The article of claim 3, wherein the barrier layer is non-breathable.

* * * * *